US008104341B2

(12) United States Patent
Lagergren et al.

(10) Patent No.: US 8,104,341 B2
(45) Date of Patent: Jan. 31, 2012

(54) ULTRASONIC LIQUID LEVEL MONITORING SYSTEM (75) Inventors: Peter J. Lagergren, Point Roberts, WA (US); Christian N. Staats, Gresham, OR (US); Kenneth M. Wegrzyn, Hillsboro, OR (US); Kelvin L. Woltring, Gresham, OR (US); Wayne A. Case, Portland, OR (US)

(73) Assignee: Schmitt Measurement Systems, Inc., Portland, OR (US)

( * ) Notice: Subject to any disclaimer, the term of this patent is extended or adjusted under 35 U.S.C. 154(b) by 470 days.

(21) Appl. No.: 12/411,242

(22) Filed: Mar. 25, 2009

(65) Prior Publication Data
US 2010/0242593 A1 Sep. 30, 2010

(51) Int. Cl.
*G01F 23/00* (2006.01)
(52) U.S. Cl. ..................................... 73/290 V
(58) Field of Classification Search ........... 73/290 V
See application file for complete search history.

(56) References Cited

U.S. PATENT DOCUMENTS

| | | | |
|---|---|---|---|
| 3,687,219 A * | 8/1972 | Langlois ...................... | 181/176 |
| 3,985,030 A | 10/1976 | Charlton | |
| 4,320,659 A * | 3/1982 | Lynnworth et al. ............ | 73/589 |
| 4,440,025 A * | 4/1984 | Hayakawa et al. ............ | 73/642 |
| 4,815,323 A | 3/1989 | Ellinger et al. | |
| 4,853,694 A | 8/1989 | Tomecek | |
| 4,868,797 A | 9/1989 | Soltz | |
| 4,901,245 A | 2/1990 | Olson et al. | |
| 5,131,271 A | 7/1992 | Haynes et al. | |
| 5,150,334 A | 9/1992 | Crosby | |
| 5,195,058 A | 3/1993 | Simon | |
| 5,235,553 A | 8/1993 | Garlick et al. | |
| 5,261,274 A | 11/1993 | Nemirow | |
| 5,319,973 A | 6/1994 | Crayton et al. | |

(Continued)

FOREIGN PATENT DOCUMENTS

JP 08-211883 * 8/1996
(Continued)

OTHER PUBLICATIONS

Notice of Allowance dated Jan. 20, 2011 for U.S. Appl. No. 11/880,671.

(Continued)

*Primary Examiner* — Hezron E Williams
*Assistant Examiner* — Nathaniel Kolb
(74) *Attorney, Agent, or Firm* — John R. Thompson; Stoel Rives LLP (57) ABSTRACT

An ultrasonic liquid level monitoring system includes an ultrasonic transducer unit that is externally mountable to a tank. An ultrasonic emitter may generate an ultrasonic beam and receive an echo of the ultrasonic beam off a liquid surface inside a tank. An acoustic lens is coupled to the ultrasonic emitter to shape the ultrasonic beam to compensate for lensing effects of the tank wall. An acoustic coupler may be disposed between the acoustic lens and the tank wall to improve the acoustic coupling between the ultrasonic emitter and the tank wall. The system determines a time-of-flight between generating the ultrasonic beam and receiving the echo. Using the time-of-flight and geometry of a tank, the system may calculate the liquid volume inside the tank. The time-of-flight may be transmitted via a satellite data link or a local data link. The local data link may further be used to configure and maintain the system.

53 Claims, 8 Drawing Sheets

U.S. PATENT DOCUMENTS

| | | | |
|---|---|---|---|
| 5,335,545 A | | 8/1994 | Leszczynski |
| 5,425,523 A | * | 6/1995 | Madey et al. ............... 248/466 |
| 5,511,041 A | | 4/1996 | Michalski |
| 5,563,478 A | | 10/1996 | Suganuma |
| 5,586,085 A | * | 12/1996 | Lichte .......................... 367/99 |
| 5,644,299 A | | 7/1997 | Cruickshank |
| 5,697,248 A | | 12/1997 | Brown |
| 5,755,136 A | | 5/1998 | Getman et al. |
| 5,778,726 A | | 7/1998 | Müller et al. |
| 5,866,815 A | | 2/1999 | Schwald et al. |
| 5,991,234 A | | 11/1999 | Sejalon et al. |
| 6,053,041 A | | 4/2000 | Sinha |
| 6,317,029 B1 | | 11/2001 | Fleeter |
| 6,396,819 B1 | | 5/2002 | Fleeter et al. |
| 6,397,656 B1 | | 6/2002 | Yamaguchi et al. |
| 6,412,344 B1 | * | 7/2002 | Danicich et al. ............ 73/290 V |
| 6,481,627 B1 | | 11/2002 | Guerreri |
| 6,536,275 B1 | * | 3/2003 | Durkee et al. .............. 73/290 V |
| 7,245,059 B2 | | 7/2007 | Lagergren et al. |
| 7,287,425 B2 | | 10/2007 | Lagergren |
| 2004/0016442 A1 | * | 1/2004 | Cawlfield ..................... 134/1.3 |
| 2004/0173021 A1 | | 9/2004 | Lizon et al. |
| 2005/0192727 A1 | | 9/2005 | Shostak et al. |
| 2005/0284218 A1 | * | 12/2005 | Lagergren .................. 73/290 V |
| 2005/0289021 A1 | | 12/2005 | Lagergren |
| 2006/0144139 A1 | | 7/2006 | Miyagawa |
| 2006/0169056 A1 | | 8/2006 | Dockendorff et al. |
| 2006/0236766 A1 | | 10/2006 | Quirch et al. |
| 2007/0016069 A1 | * | 1/2007 | Grunwald et al. ............ 600/468 |
| 2007/0080609 A1 | | 4/2007 | Johnson et al. |
| 2007/0084283 A1 | | 4/2007 | Carlson et al. |
| 2007/0261487 A1 | * | 11/2007 | Sintes et al. ................ 73/290 V |
| 2008/0208060 A1 | | 8/2008 | Murkin |
| 2009/0025474 A1 | | 1/2009 | Lagergren |

FOREIGN PATENT DOCUMENTS

| | | |
|---|---|---|
| WO | WO 2009/014790 A1 | 1/2009 |

OTHER PUBLICATIONS

Office Action dated Jul. 28, 2010 for U.S. Appl. No. 11/880,671.
Response to Office Action dated Dec. 28, 2010 for U.S. Appl. No. 11/880,671.
Response to Office Action dated Jul. 13, 2010 U.S. Appl. No. 11/880,671.
Office Action dated Apr. 14, 2010 U.S. Appl. No. 11/880,671.
Response to Office Action dated Dec. 23, 2009 U.S. Appl. No. 11/880,671.
International Search Report and Written Opinion dated Aug. 7, 2008 for PCT/US08/62603.
Response to Restriction Requirement dated Jun. 29, 2009 for U.S. Appl. No. 11/880,671.
Restriction Requirement dated May 28, 2009 for U.S. Appl. No. 11/880,671.
Response to Office Action dated Mar. 23, 2007 for U.S. Appl. No. 11/131,435.
Response to Office Action dated Mar. 23, 2007 for U.S. Appl. No. 11/131,434.
International Search Report (5 pgs.) and Written Opinion (7 pgs.), PCT/US2010/028586, filed Mar. 25, 2010, mailed Oct. 28, 2010, 35 pgs.
Office Action mailed Oct. 2, 2009 in U.S. Appl. No. 11/880,671, filed Jul. 23, 2007.
International Search Report mailed Aug. 7, 2008 in PCT Application No. PCT/US08/62603, filed May 5, 2008.
Written Opinion of the International Searching Authority mailed Aug. 7, 2008 in PCT Application No. PCT/US08/62603, filed May 5, 2008.
Office Action mailed Nov. 17, 2006 in U.S. Appl. No. 11/131,434, filed May 16, 2005.
Office Action mailed Nov. 21, 2006 in U.S. Appl. No. 11/131,435, filed May 16, 2005.
Notice of Allowance mailed May 3, 2007 in U.S. Appl. No. 11/131,434, filed May 16, 2005.
Notice of Allowance mailed May 22, 2007 in U.S. Appl. No. 11/131,435, filed May 16, 2005.
International Preliminary Report on Patentability and Written Opinion mailed Aug. 7, 2008 for PCT/US2008/062603.
International Preliminary Report on Patentability and Written Opinion mailed Oct. 28, 2010 for PCT/US2010/028586.

* cited by examiner

ULTRASONIC LIQUID LEVEL MONITORING SYSTEM

TECHNICAL FIELD

The present disclosure relates to ultrasonic measurement systems for sensing a liquid level inside a tank.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting, the embodiments will be described and explained with specificity and detail in reference to the accompanying drawings in which:

DETAILED DESCRIPTION OF PREFERRED EMBODIMENTS

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the present disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, and electromagnetic interaction. Two components may be coupled to each other even though they are not in direct contact with each other.

Sensing a liquid level contained in a tank may be performed utilizing sonic or ultrasonic measurement techniques. An externally mounted ultrasonic emitter may generate an ultrasonic beam and receive an echo of the ultrasonic beam off a liquid surface inside the tank. The amount of time that passes between generating the beam and receiving the echo may be determined and may be referred to as a time-of-flight. If a liquid level and density are known and the geometry of a tank is known, then the liquid volume in the tank can be calculated based upon the time-of-flight.

In such a system, adequate acoustic coupling is necessary between the ultrasonic transducer and the tank. Transference of the ultrasonic beam is preferably maximized in order to obtain reliable readings. If the coupling is poor, it may not be possible to obtain a measurement, or any measurement obtained may be unreliable. Acoustic coupling may be improved by creating a uniform interface between the ultrasonic transducer and the tank wall. A uniform interface may be created by providing an acoustic coupler that is shaped to be complimentary to the shape of the tank.

Dominating any solution to such problems is a question of cost. Cost includes the cost of the system, cost of installation, and cost of operating the system. A solution which enables measurement of a liquid level, but which requires a costly installation or costly maintenance on each tank of each customer is an impractical solution. In an effort to reduce costs, it is desirable to make the installation and maintenance of the measurement system simple, such that minimal training of personnel is required. As disclosed below, installation and maintenance of an ultrasonic liquid level monitoring system may be simplified by including in the system an interface for configuring the system and obtaining information from the system using a portable electronic device.

Disclosed herein is an ultrasonic liquid level monitoring system for sensing the liquid level in a tank. The system includes an ultrasonic transducer unit externally mountable on a tank and a communications unit in electrical communication with the transducer unit. The communications unit may be mounted on the tank and connected to the transducer unit by an electrical cable. The communications unit may include an interface for communicating with a portable electronic device. The portable electronic device may be capable of providing configuration instructions to the system and receiving data from the system.

The transducer unit may include a piezoelectric crystal ("piezo") transducer, a piezo driver circuit, and a temperature sensor. In response to command signals from the communications unit, the piezo driver circuit causes the piezo to generate an ultrasonic beam having a controlled pulse frequency. Systems and methods for adaptively determining a controlled pulse frequency for measuring a liquid level are disclosed in U.S. Pat. No. 7,287,425 (the "425 Patent"), the entirety of which is incorporated by reference. The transducer unit may further include an acoustic lens disposed between the piezo and a tank wall. System and methods for using an acoustic lens to optimize the shape of the ultrasonic beam and to control dispersion of the ultrasonic beam's wave front are disclosed in U.S. patent application Ser. No. 11/880,671 (the "671 Application"), the entirety of which is incorporated by reference.

The transducer unit may further comprise an acoustic coupler disposed between the acoustic lens and the tank wall to improve the transference of the ultrasonic beam from the ultrasonic transducer to the tank. The acoustic coupler may be joined to the tank wall using an acoustic coupling agent. Pulse trains originating from the piezo pass through the lens, acoustic coupler, the coupling agent, and into the tank wall and into the liquid. Then the piezo listens for return echoes from the liquid surface inside the tank. Echo return signal information is sent to the communications unit from the transducer unit.

The process of transmitting ultrasonic pulse trains into a tank and listening for return echoes is referred to herein as "pinging" the tank and listening for a return echo. As is well understood by those skilled in the art, the time that it takes for a transmitted signal to reach the liquid surface and to be echoed back, the time-of-flight, will correspond to the liquid level. With knowledge of the tank geometry along with temperature and density of the liquid, a measurement of the volume of the liquid in the tank can then be calculated. Many tanks are typically horizontally mounted circular cylinders and have either hemispherical or ellipsoidal end caps.

A temperature sensor may be useful because, as is well understood by those skilled in the art, tank fill level will vary with increasing or decreasing temperatures. Thus, the time-of-flight measured at one temperature may be the same as the time-of-flight measured at another temperature. Yet, the actual volume of the liquid in the tank at the two temperatures may differ. The volume of a liquid in a container, including liquid fuels such as propane, is related to its temperature. The volume of a liquid rises and falls with temperature. With knowledge of the volume of a liquid as a function of temperature, a more accurate measurement of the volume of the liquid in the tank can be calculated at any given temperature. When the transducer unit includes a temperature sensor, a signal representing the temperature may be included with time-of-flight data when a measurement is taken.

The tank wall acts as a lens when ultrasonic waves are passed from the exterior of the tank, through the tank wall, and into the entrained space inside the tank. This lensing effect provides a certain amount of beam collimation/dispersion that is dependent on the radius of the tank wall, the diameter of the piezo element, and the shape of any intervening acoustically transparent media. This beam collimation/dispersion of the ultrasonic beam formed by the piezo element is potentially reduced in effectiveness by either the unwanted narrowing of the beam, or the beam is reduced in effective power due to the unwanted divergence of the beam.

In the case of inappropriate beam collimation, the beam can be sufficiently narrow so that any misalignment of the transducer element from the exact perpendicular line from the bottom dead center of the tank to the liquid surface can cause the loss of measurable echo. In this case, the first reflected ultrasonic packet does not impact the area of the inner tank bottom where the piezo element is located on the exterior tank wall. This prevents the transducer unit from sensing the arrival of the first return reflection. Instead, the packet is reflected back to the surface of the liquid from the inner tank wall. Because the inner tank wall is a spherical acoustic reflector, the second, third, or fourth reflections from the liquid surface may return exactly to the transmission point on the inner surface of the tank.

In this case, the measured power of the second arrival of the ultrasonic beam at the piezo may be sufficient to cause the transducer unit to measure the second arrival as the "correct" time-of-flight of the ultrasonic packet from the piezo to the surface of the liquid and return to the piezo. This effect causes an incorrect reading of the measured distance. The use of successively larger piezo elements aggravates this problem in that the beam angle of an ultrasonic packet transmitted by a larger diameter piezo decreases in proportion to the diameter of the piezo. This is a serious problem in that the use of a larger diameter piezo is indicated where a higher ultrasonic flux is required. This may be due to longer range requirements or thicker tank walls, but this also means that beam alignment becomes substantially more difficult. More difficulty in installation requires additional cost and training expenses for operators of the system.

An acoustic lens may be used to effectively shape the ultrasonic beam into an advantageous pattern as described in the 671 Application. The acoustic lens described in the 671 Application provides a more robust solution to the problem of alignment of an ultrasonic transducer in that controlling the shape of the beam makes the installation much more tolerant of misalignment; however, effectively coupling an ultrasonic transducer to a tank wall poses an additional challenge because the radius of the tank wall may not be complimentary to the shape of the lens. An uneven interface between the tank wall and the lens may reduce the transmission of the ultrasonic beam into the tank wall and may introduce additional lensing effects.

An acoustic coupler as described herein improves acoustic coupling between the ultrasonic transducer and the tank, thus improving the transference of the ultrasonic beam. Improved transference of the ultrasonic beam improves the accuracy and reliability of the system.

It is well known in the art to use an externally mounted ultrasonic transducer mounted to the bottom of a tank, the surface of which is in intimate contact with the liquid inside the tank. It is substantially more difficult to transmit an ultrasonic beam through the top of the tank and then through the gas phase above the liquid and then sense and time the echo from the gas/liquid interface. The relatively higher losses of acoustic energy while transiting the gas phase can be mitigated by using an acoustic lens to shape the ultrasonic beam into a more compact beam and by using an acoustic coupler to increase the transmission of the ultrasonic beam through the tank wall. These solutions increase the cross-sectional area energy density of the ultrasonic beam and increase the likelihood of detection of the reflected beam.

Figure 1:
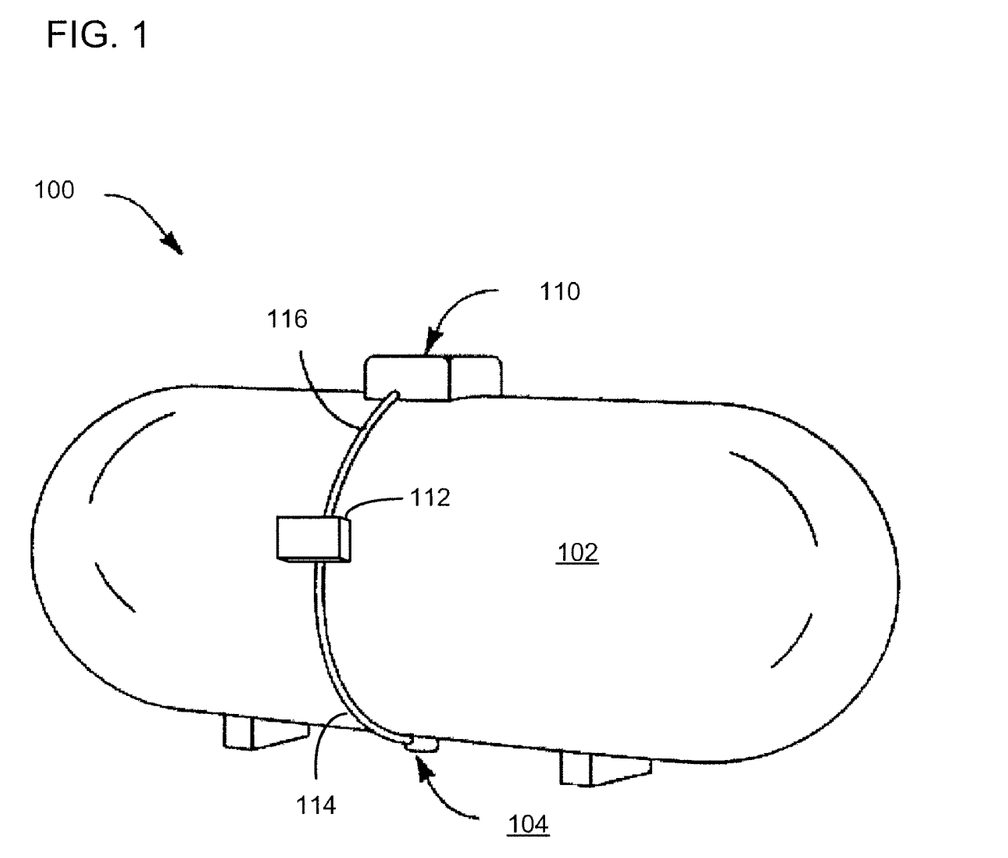
FIG. 1 is a perspective view of an embodiment of an ultrasonic liquid level monitoring system mounted externally to a propane fuel tank.

Referring to FIG. 1, an ultrasonic liquid level monitoring system 100 is shown for sensing the liquid level inside a tank 102. The system 100 includes an ultrasonic transducer unit 104 that is externally mounted to the bottom of the tank 102. The liquid in the tank may be a liquid fuel, such as propane. The system 100 includes a battery box 112 that is in electrical communication with the transducer unit 104 through an electrical cable 114. The electrical cable 114 may be configured to provide a synchronous serial data link as well as electrical power to the transducer unit 104. The transducer unit 104 transmits ultrasonic signals through the tank wall and receives return echoes from the liquid surface (not shown) in the tank. These signals are transmitted to the communications unit 110. The communications unit 110 directs the operation of the transducer unit 104 and collects time-of-flight data and temperature data from the transducer unit 104.

The battery box 112 is preferably located in a position that allows for easy access. Operators of the system 100 may be required to access battery box 112 in order to replace a battery. As shown in FIG. 1, battery box 112 may be disposed between the transducer unit 104 and a communications unit 110. Communications unit 110 may be mounted to the top of tank 102 or in another suitable location. Communications unit 110 may be connected to battery box 112 through an electrical cable 116. Electrical cable 116 may provide both electrical power as well as a data link. The length of electrical cables 114 and 116 may be adjusted to position the battery box 112 at a convenient location that permits easy access by system operators.

Figure 2:
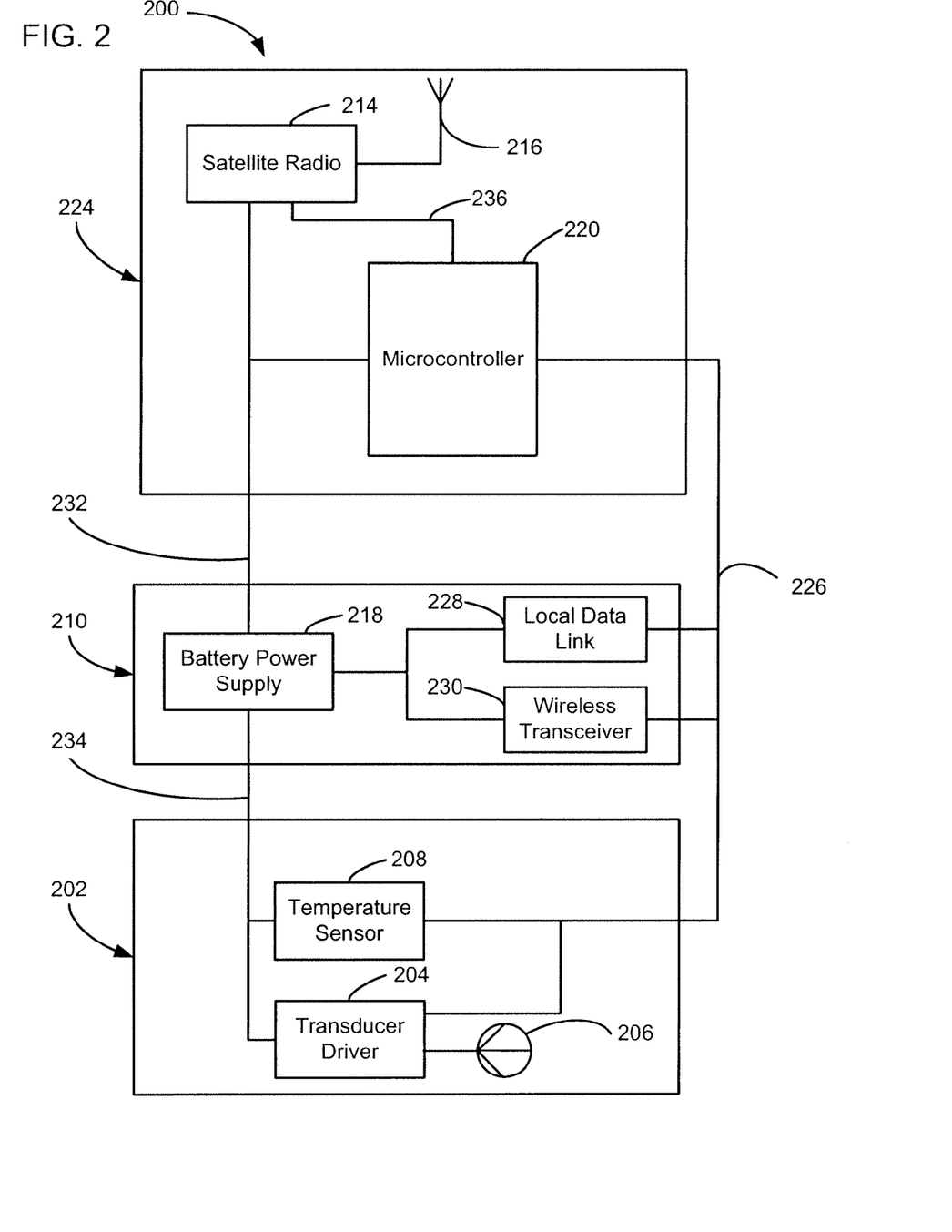
FIG. 2 is a block diagram of an embodiment of a monitoring system.

Referring to FIG. 2, a block diagram of an ultrasonic liquid level monitoring system 200 is shown. The system 200 includes a transducer unit 202 comprising a transducer driver 204, an emitter 206 to emit an ultrasonic beam and receive an echo, and a temperature sensor 208. The emitter 206 may be embodied as a piezoelectric crystal transducer 206. When excited, the piezo 206 emits an ultrasonic beam. Increasing the piezo diameter increases the transmission power, as power increases with the square of the piezo radius. Increasing the piezo diameter also narrows the hemispherical beam. A narrower beam has more power-per-unit area and is more likely to receive an echo. The temperature sensor 208 is used to obtain a measurement of the temperature of the liquid in the tank, which is desirable in order to adjust readings taken for variations in the volume of the liquid caused by temperature variations.

A battery 218 is contained in a battery box 210. The battery 218 is in electrical communication with all components in the ultrasonic liquid level monitoring system 200 requiring electrical power. Electrical cables 232, 234 may connect the battery box 210 to a communications unit 224 and the transducer unit 202. Battery box 210 may also contain a local data link 228 and a wireless transceiver 230. The local data link 228 and the wireless transceiver 230 may be in communication with a microprocessor 220 by way of a data connection 226. Local data link 228 may be embodied as an RS-232 port. In alternate embodiments, local data link 228 may be embodied as an Ethernet port, universal serial bus (USB) port, IEEE 1394 port, and the like. Local data link 228 may be connected to a wireless transceiver 230. Wireless transceiver 230 may be a Bluetooth wireless module, or may operate using other wireless technologies including IEEE 802.11 (a/b/g/n), wireless USB, ultrawide band, and the like.

The communication unit 224 may comprise the microprocessor or microcontroller 220. The microcontroller 220 is powered by the battery power supply 218. The microcontroller 220 may also be in electrical communication with a satellite radio 214 by way of the data link 236. The microcontroller 220 may further include memory and firmware. The firmware may store instructions for controlling the system 200. The firmware may be updated periodically to provide additional functionality or improvements to the system 200. The data connection 226 and the electrical cables 232, 234 may be embodied within a single cable. The satellite radio 214 is in communication with an antenna 216 and the battery power supply 218. To minimize size and cost, the satellite radio 214 may be a simplex radio capable of transmitting but not receiving.

The microcontroller 220 may measure the liquid level in a tank according to a schedule. When scheduled measurements occur, information about the time-of-flight, the temperature of the liquid, and the battery level may all be collected and transmitted in a single transmission using satellite radio 214 and antenna 216.

FIG. 2 represents only one possible embodiment of an ultrasonic liquid level monitoring system. One of skill in the art will appreciate that numerous variations are possible. For example, microcontroller 220 may be located within the battery box 210. In other embodiments, communication technologies in addition to, or in place of, satellite radio 214 may be utilized. It is contemplated that an Internet connection via a fixed telephone network, wireless telephone network, cable network, and other known networking technologies may be utilized to transmit time-of-flight data, temperature data, and battery level of the system. It is further contemplated that the system 200 may be connected to a power grid, thus eliminating the necessity of the battery power supply 218.

Figure 3:
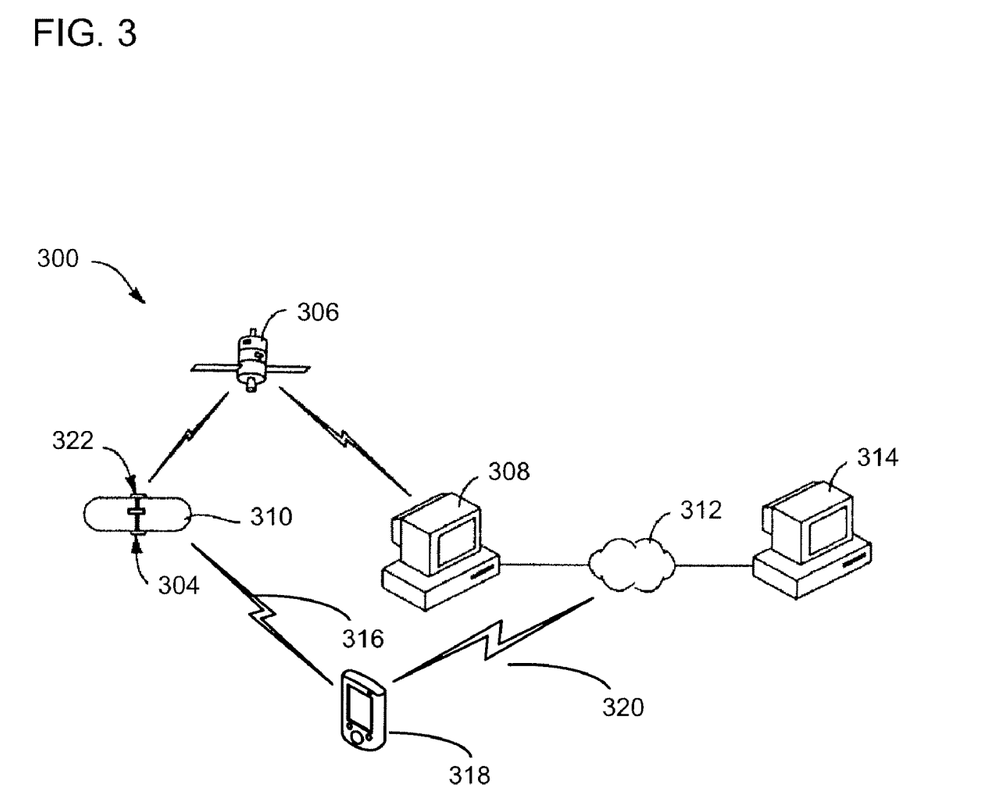
FIG. 3 illustrates a working environment of a propane tank and an ultrasonic liquid level monitoring system.

Referring to FIG. 3, a working environment 300 is shown wherein data is collected by a communications unit 322 from a transducer unit 304, including time-of-flight, temperature data, and battery level data. The data may be transmitted from a first interface via a satellite data link 306 to an earth station 308. The data may be alternatively or concurrently transmitted from the communications unit 322 to a portable electronic device 318 via a second interface, such as a local wireless interface 316.

Earth station 308 or portable electronic device 318 receives the data input and, together with previously stored information on tank geometry and dimensions and suitable computer readable instructions, processes the received data to calculate the volume of the liquid in the tank 310. The calculated measurement may also be stored in the storage medium and may be read out and displayed by Earth station 308 or portable electronic device 318. Earth station 308 or portable electronic device 318 may be in electrical communication with a network 312, such as a LAN, WAN, or the Internet. Through network 312, the calculated measurement may be read out, displayed or stored on a second computer 314. Portable electronic device 318 may be connected to network 312 using mobile data communications link 320. In alternative embodiments, portable electronic device 318 may lack a mobile data communications link, but may later be synchronized with a computer system and may, at that time, transfer information about the volume of the liquid in the tank 310.

Portable electronic device 318 may be embodied as a wide variety of commercially available portable electronic devices. For example, portable electronic device 318 may be a portable computer, a personal digital assistant (PDA), or a cellular telephone. Many commercially available portable electronic devices include the ability to communicate using wireless data protocols, such as Bluetooth, IEEE 802.11, or include wired communication ports, such as Ethernet, RS-232, USB, or IEEE 1394. Further, many commercially available portable electronic devices are capable of performing calculations and running software applications that may be required in order to determine a liquid level or to interface with the communications unit 322. A local data link configured to communicate with a portable electronic device is advantageous in minimizing the installation and servicing costs associated with a liquid level monitoring system.

Figure 4A:
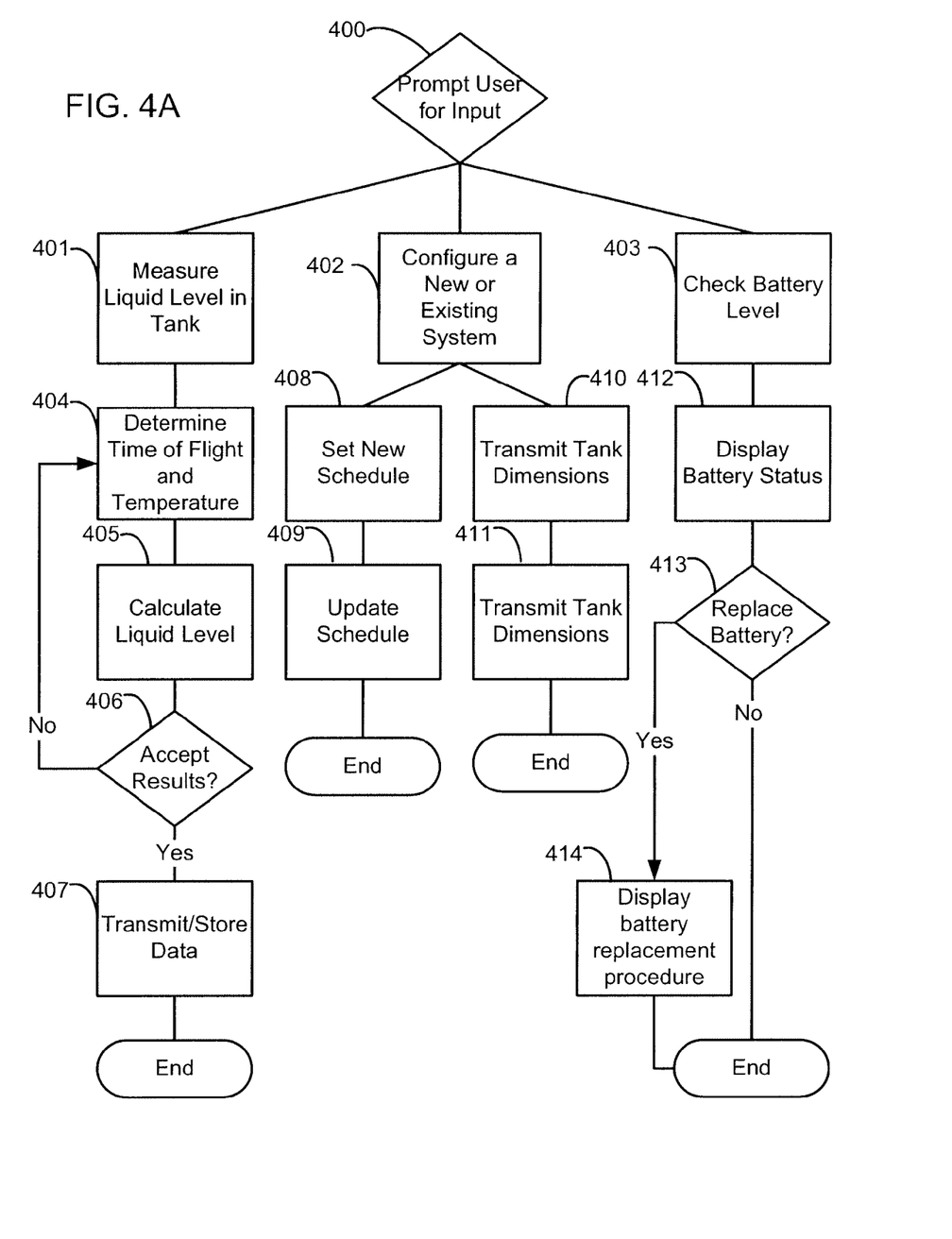
FIG. 4A is a flow chart illustrating possible commands a user may issue to an ultrasonic liquid level monitoring system using a portable electronic device.

An exemplary diagram showing a flow chart of possible options using the portable electronic device is shown in FIG. 4A. In this example, the portable electronic device prompts a user at step 400 to select from various options, which may include measuring the liquid level in the tank, configuring a new or existing system, and checking a system's battery level. Depending on the operator's input, various actions may be taken.

If the operator desires to measure the liquid level in the tank 401, the system may perform a frequency search as described in the 425 Patent and determine a time-of-flight 404 of an ultrasonic pulse from the ultrasonic transducer to the liquid surface inside the tank. The portable electronic device may then calculate the volume of the liquid in the tank 405 based on the time-of-flight reported by the system. In step 406, the system may prompt the user to accept or reject the measurement. If the user accepts the data, the data may be transmitted 407 via satellite to the billing database, or may be stored in the portable electronic device for later reconciliation with a billing database. Using the measure liquid level in the tank option shown at step 401, an operator may ensure the proper functioning of a new system or may test an existing system by measuring the liquid level before filling the tank and after filling the tank. As will be appreciated, in embodiments involving liquid fuels, in order to ensure correct billing, the process of refilling the tank requires that the amount of fuel put into the tank is carefully measured. Accordingly, the accuracy of the liquid level monitoring system may be checked by comparing the measured fuel level before and after the filling with the known amount of fuel added to the tank. In this way, problems with the system may be identified and addressed while an operator is on site.

An operator may further configure a new system or reconfigure an existing system at step 402. In the case of a new system installation, a portable electronic device may be used to commission the system. In commissioning a system, various information about the tank may be set while an operator is on site. For example, the operator may set a schedule at step 408 for measuring the liquid level in the tank (e.g., daily, weekly). This information may be updated in the microcontroller at step 409. Additional detail regarding a system operating according to a schedule is described below with reference to FIG. 4B. An operator may further set the dimensions of the tank (e.g., diameter, length, hemispherical/ellipsoidal end caps) at step 410. In step 411, the updated dimensions may be transmitted using the satellite link.

In the case of a new system, an operator may use the portable local device to enter the new tank into an accounting system or customer database. A Global Position System receiver may be integrated into the portable electronic device and may further automate the process by tracking the location of all existing tanks in a company's portfolio.

Finally, an operator may also check the system's battery level as illustrated in step 403. Information about the battery level may be displayed on a portable electronic device at step 412. This feature may allow an operator who is on site, for example, to refill a tank, to determine whether a battery should be replaced. Checking a system's battery level each time the tank is refilled will help to reduce system downtime and maintenance costs associated with dispatching an operator to replace the system's battery. At step 413, the operator may be prompted to determine whether a battery should be replaced. If the battery is to be replaced, a battery replacement procedure may be displayed at step 414 to facilitate the replacement of the battery.

Figure 4B:
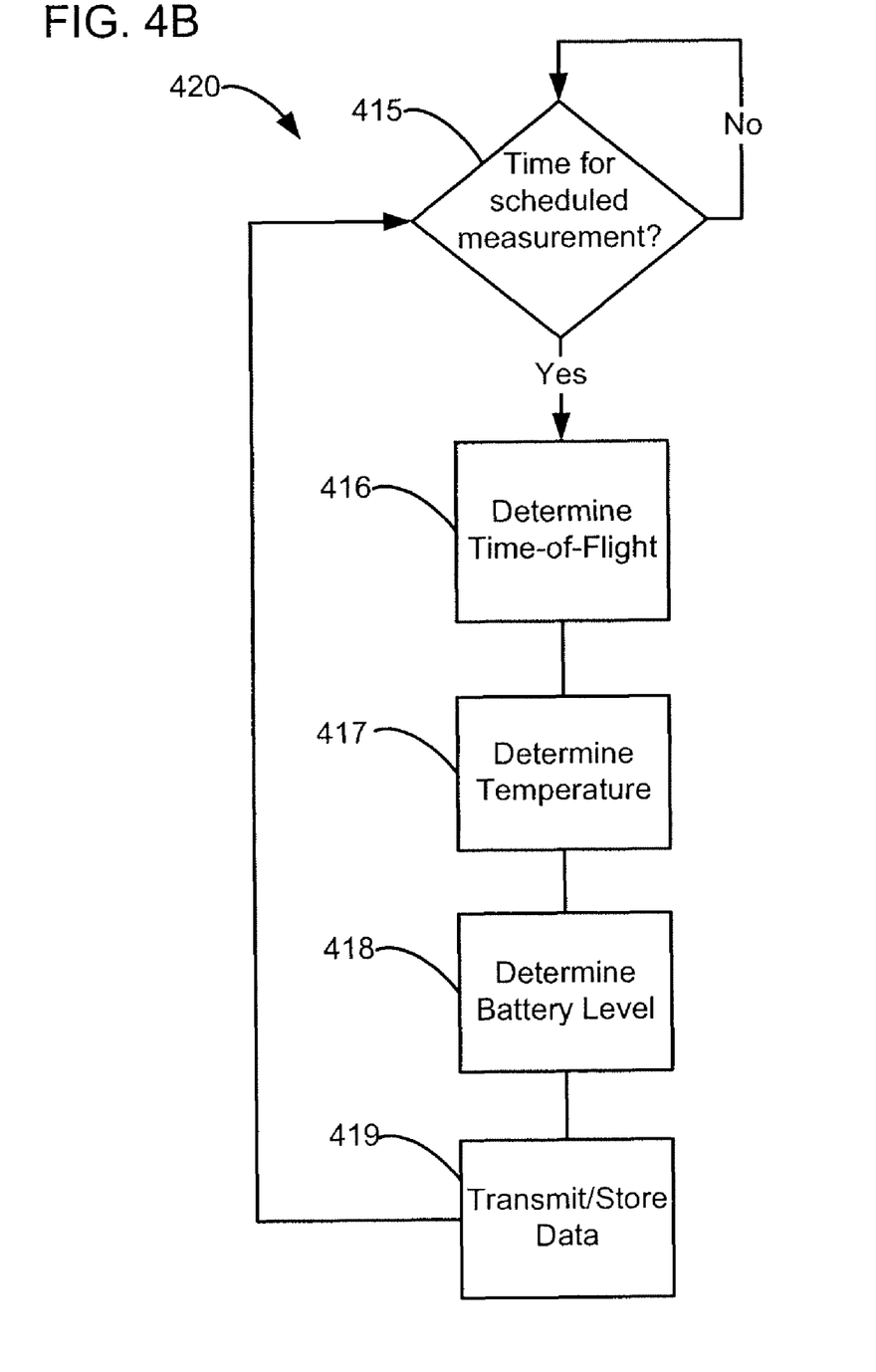
FIG. 4B is a flow chart illustrating an embodiment of a method for monitoring a liquid level in a tank according to an established schedule.

FIG. 4B is one embodiment of a method 420 for monitoring a liquid level in a tank according to an established schedule. At step 415, the system determines whether it is time for a scheduled measurement. If so, at step 416, a time-of-flight is determined. At step 417, the temperature of the liquid is determined. At step 418, the battery level of the system is determined. At step 419, the time-of-flight, temperature, and battery level may all be transmitted via a satellite data link or a local data link. As one of skill in the art may appreciate, the order of step 416, 417, and 418 may be altered; however, in a preferred embodiment, the step of determining the temperature 417 is performed contemporaneously with the step of determining the time-of-flight 416. Transmitting the battery level together with the time-of-flight and temperature data each time such measurements are taken allows for a more accurate prediction of battery life, and may also reduce the number of maintenance calls that must be made to service each tank.

Figure 5A:
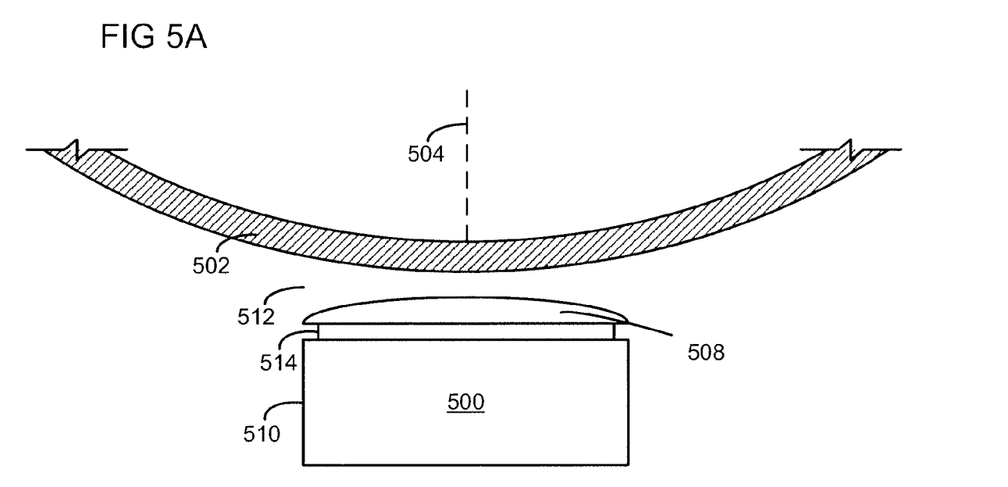
FIG. 5 is a cross-sectional view of an ultrasonic transducer unit mounted to the exterior of a tank wall and illustrating an acoustic coupler.

FIG. 5A is a cross-sectional view of an ultrasonic transducer unit 500 mounted to an exterior tank wall 502. Preferably, ultrasonic transducer unit 500 is located at the bottom dead center (BDC) of the tank. Typically the BDC on a large tank may be found within approximately +/− one degree of a tank centerline 504. In some cases, the tank wall 502 is not a smooth surface. This may be due to construction anomalies, such as wrinkles from cold rolling steel, etc., which effectively move the BDC.

The tank wall 502 may act as a lens to distort and misdirect a generated ultrasonic beam. A corrective lens may be installed in the beam path to compensate for misdirection. An acoustic lens 508 is shown disposed between an ultrasonic emitter 510, such as a piezo, and the tank wall 502. As illustrated in FIG. 5A, the shape of the lens 508 may not be complimentary to the tank wall 502. A void 512 may exist between the tank wall 502 and the lens 508. The void 512 may introduce additional lensing effects and may decrease the transference of the ultrasonic pulse into the tank. The void 512 may be filled with a joining material; however, the wave front of the ultrasonic beam is shaped by the differences in the velocity of sound of the media through which the beam is traveling. Accordingly, it is preferable that the void be filled by a substance of known acoustical properties. Further, it is preferable that the interface between the tank wall and the acoustic device be as uniform as possible.

Figure 5B:
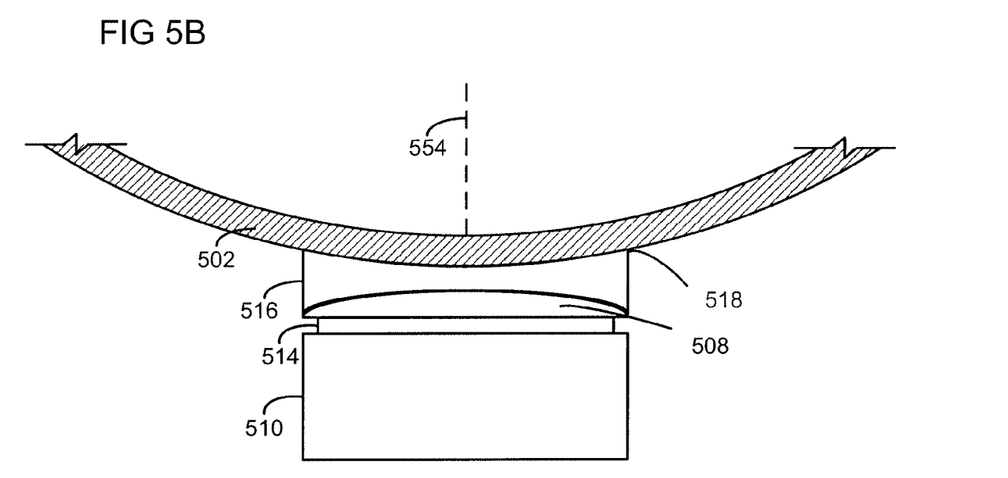

As illustrated in FIG. 5B, an acoustic coupler 516 may be disposed between the acoustic lens 508 and the tank wall 502. The precise configuration of the acoustic coupler 516 will vary based on the shape of the acoustic lens 508 and the tank wall. As discussed in greater detail in the 671 Application, the acoustic lens 508 may be convex, concave, or a more complex shape such that the wave front is shaped both in the radial axis of the tank and in the longitudinal direction of the tank. The shape of the acoustic coupler will also vary depending on the curvature of the tank wall 502. In one embodiment, the acoustic coupler may have a center thickness between approximately 0.010 and 0.25 inches at its minimum thickness. Other thicknesses are also encompassed within the scope of this disclosure.

The acoustic coupler 516 may be made of polyurethane with a hardness ranging from about 20 to about 80 durometer, shore A. In one embodiment, the acoustic coupler 516 is made of polyurethane with a hardness of about 55 durometer, shore A. Polyurethane in the hardness range from about 20 to about 80 durometer, shore A, will allow the acoustic coupler 516 to be self-forming. In other words, the acoustic coupler 516 may be able to conform to the unique shape of the tank wall 502 and/or construction anomalies (e.g., wrinkles from cold rolling steel, etc.). The acoustic lens and acoustic coupler may be bonded together. A bonding process with precision molding equipment may be employed to assure close tolerance and positioning of the acoustic coupler to the surface of the lens. In an alternative embodiment, the acoustic lens and acoustic coupler may be integrally formed. In yet other embodiments, an acoustic coupler 516 may be formed at the time of installation, by applying a layer of silicone gel on the acoustic lens and mounting the ultrasonic transducer unit 500 on the tank wall 502. An embodiment in which the acoustic coupler 516 comprises silicone gel is another example of a self-forming acoustic coupler 516.

Figure 6A:
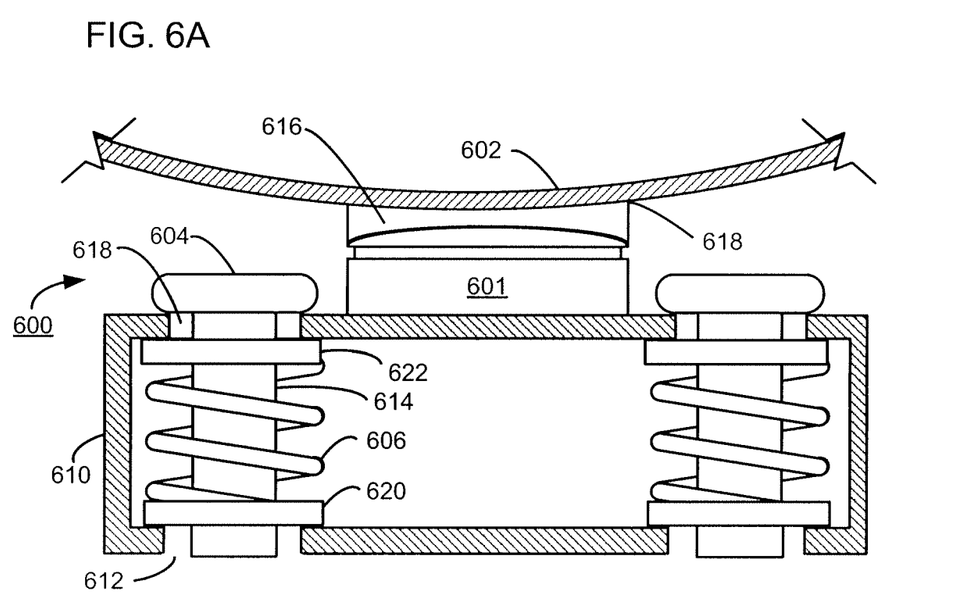
FIG. 6A is a cross-sectional view of an ultrasonic transducer unit including an apparatus for mounting an ultrasonic transducer to the exterior of a tank wall using a plurality of mounting magnets and springs.
Figure 6B:
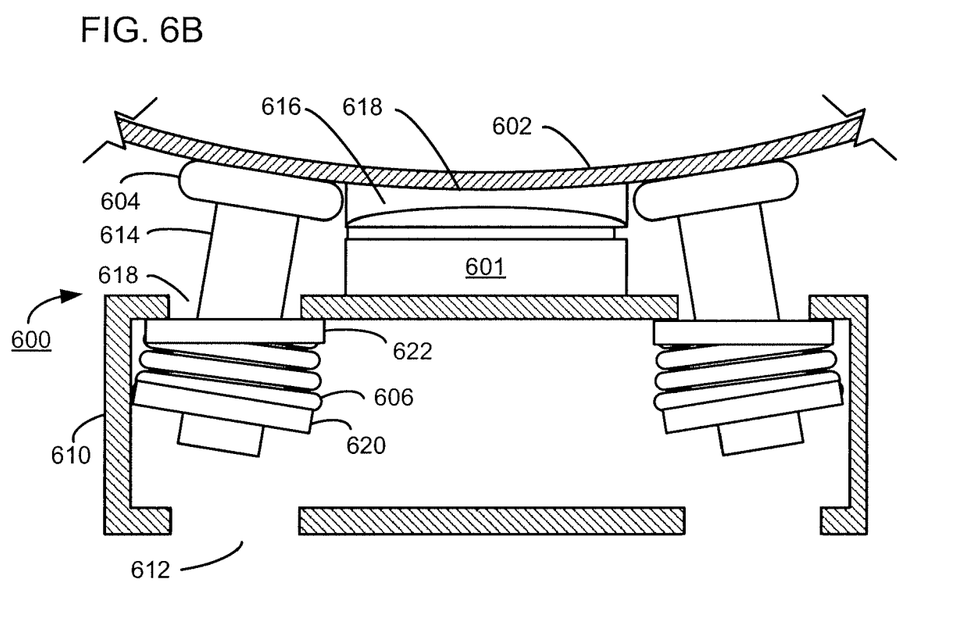
FIG. 6B is a cross-section view of an ultrasonic transducer unit mounted to the exterior of a tank wall.

As illustrated in FIG. 5B, the interface 518 between the acoustic coupler 516 and the tank wall 502 is uniform. The acoustic coupler 516 may be secured to the tank wall 502 with a coupling material (not shown). The coupling material may be a thin and uniform layer of an acoustically transparent material that is not effected by extreme cold and heat. The coupling material may be a homogeneous silicone grease or oil of a variety of viscosities. The acoustic lens 508 may be secured to the emitter 510 through another bonding material 514, such as an epoxy agent. In one embodiment, the bonding material 514 may be applied with a thickness ranging from approximately 0.001 inches to approximately 0.005 inches. The bonding material 514 is preferably applied with a uniform thickness. In installation, the acoustic lens 508 may be heated prior to bonding to eliminate any absorbed water. FIGS. 5A and 5B are not drawn to scale, and certain features, including gap 512 and the curvature of acoustic lens 508, have been exaggerated for purposes of illustration As discussed above, it is desirable to adequately couple an ultrasonic transducer unit to a tank wall and to make the process for mounting the transducer unit as simple and quick as possible. FIGS. 6A and 6B illustrate one embodiment that allows for quick installation, that properly aligns a plurality of mounting magnets to the curved surface of a tank, and that provides sufficient coupling of the ultrasonic transducer unit 601 to the tank wall 602. Referring to FIG. 6A, an embodiment including an apparatus 600 for mounting an ultrasonic transducer unit 601 to a tank wall 602 is shown. The ultrasonic transducer unit 601 is connected to a base 610. The base 610 provides a suitable foundation for connecting the ultrasonic transducer unit 601 to a mounting apparatus 600. The base 610 is connected to a plurality of mounting magnets 604, and each mounting magnet 604 is connected to a rod 614. A spring 606 may be disposed around the rod 614 and between a first washer 620 and a second washer 622. The spring 606 may be disposed within a hollow portion of the base 610. A gap 618 may exist in the top of the base 610 at the point where the rod 614 exits the base 610. The gap 618 may allow for some adjustment of the magnet 604 to compensate for the curvature of the tank wall 602.

In the retracted position shown in FIG. 6A, the spring 606 may be slightly compressed from an equilibrium position. This slight tension on the spring 606 may hold the magnet 604 in a retracted position, such that the magnet 604 is held in contact with the base 610. The first washer 620 may be slightly larger than a hole 612 in the bottom of the base 610. The hole 612 may allow a user to exert an upward force on the rod 614 using a finger or a tool in order to further compress the spring 606 and cause the magnet 604 to contact the tank wall 602, as shown in FIG. 6B. The second washer 622 may be placed at the top of the spring 606. The second washer 622 may slide with respect to the rod 614, such that the spring 606 may move between the position shown in FIG. 6A and the position shown in FIG. 6B. The second washer 622 may be slightly larger than the gap 618, such that the second washer 622 will not pass through the gap 618 when the spring 606 is compressed.

FIG. 6B shows the plurality of mounting magnets 604 in contact with the tank wall 602 and holding the transducer unit 601 in intimate contact with the tank wall 602. The gap 618 may be sufficiently large so as to accommodate any deflection required by the curvature of the tank wall 602, so as to allow the face of the mounting magnet 604 to be substantially parallel to the tank wall 602. In alternative embodiments, a swivel joint or ball joint may connect the rod 614 to the mounting magnet 604 and may allow sufficient rotation to ensure that the face of each mounting magnet 604 is substantially parallel to the tank wall 602 when mounted.

As illustrated in comparing FIG. 6A with FIG. 6B, the springs 620 have been compressed and will store an amount of force approximated by Hooke's law. According to Hooke's law, $F=-kx$, where x is the distance that the spring has been compressed, F is the restoring force exerted by the springs 606, and k is the force constant (or spring constant). The negative sign indicates that the restoring force F acts in the opposite direction of the displacement x. The force F will be transferred through the base 610, pushing the acoustic coupler 616 against the tank wall 602. A desired force F may be realized by appropriately selecting springs 606 with an appropriate force constant and an appropriate distance of travel x. In one embodiment, the combination of the springs 606 and mounting magnets 604 may be configured to provide a pressure at the interface 618 between the tank wall 602 and the acoustic coupler 616 that is approximately 1.5 pounds per square inch. In one embodiment, the plurality of mounting magnets 604 may be rare earth magnets. The attractive force between the mounting magnets 604 and the tank wall is greater than the restoring force exerted by the springs 606. Accordingly, the mounting apparatus 600 remains attached to the tank wall 602.

The mounting apparatus 600 facilitates the creation of a uniform interface 618 between the acoustic coupler 616 and the tank wall 602. As discussed above, an extremely thin and uniform layer of an acoustically transparent material, such as silicone grease, may be disposed at the interface 618. A uniform pressure at the interface forces the silicone grease or oil into a uniform distribution along the interface 618.

Figure 7:
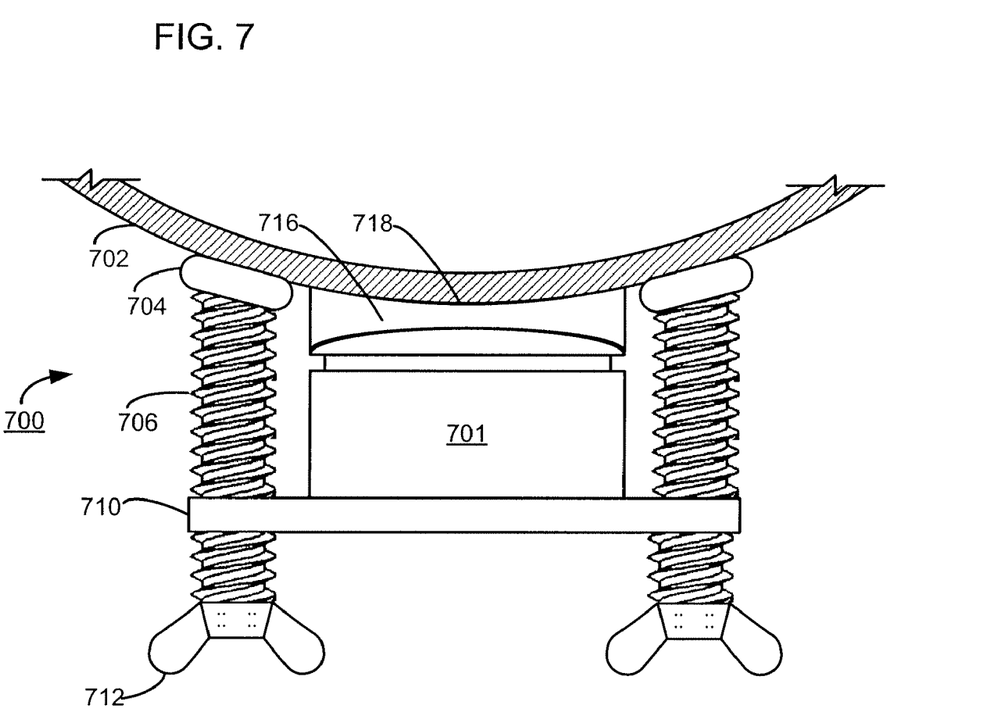
FIG. 7 is a cross-sectional view of an ultrasonic transducer unit including an apparatus for mounting an ultrasonic transducer to the exterior of a tank wall using a plurality of mounting magnets and screws.

In an alternative embodiment shown in FIG. 7, an apparatus 700 is shown that comprises a plurality of mounting magnets 704 and screws 706 that may be used to mount the transducer unit 700 to the tank wall 702. Each magnet 704 may be connected to a screw 706. The base 710 may be configured with threaded apertures. The screws 706 may be turned by rotating a wingnut 712, thus causing the mounting magnet 704 to move relative to the base 710. By turning the screws 706, the pressure at the interface between the ultrasonic transducer 700 and the tank wall 702 may be adjusted. Accordingly, an acoustically transparent material, such as silicone grease, may be forced into a uniform distribution along the interface 718 between the acoustic coupler 716 and the tank wall 702.

The mounting apparatuses depicted in FIG. 6 and FIG. 7 facilitates mounting an ultrasonic transducer to the exterior of a tank. As will be appreciated, the apparatuses require minimal training for installation. In the case of mounting apparatus 600, the operator is only required to position the ultrasonic transducer 601 at the appropriate location on the tank wall 602 and press the buttons 612 to mount the transducer unit. In the case of mounting apparatus 700, the operator needs only to turn the wingnuts 712 to mount the transducer unit.

It will be obvious to those having skill in the art that many changes may be made to the details of the above-described embodiments without departing from the underlying principles of the invention. The scope of the present invention should, therefore, be determined only by the following claims.

The invention claimed is:

1. An ultrasonic transducer unit externally mountable to a tank wall and operable to measure a liquid level inside a tank, comprising:
   an emitter to generate an ultrasonic beam to pass through a tank wall and to receive an echo of the ultrasonic beam off a liquid surface inside the tank;
   a transducer driver in electrical communication with the emitter;
   an acoustic lens coupled to the emitter and including a convex outer surface and configured to shape the ultrasonic beam and configured to diverge the ultrasonic beam and thereby provide an ultrasonic beam with a uniform wavefront after the ultrasonic beam passes through a tank wall; and
   an acoustic coupler disposed adjacent the acoustic lens and including,
      a first concave surface to receive the convex outer surface of the acoustic lens, and
      a second concave surface to compliment the curvature of the tank wall, wherein the acoustic coupler is configured to increase transmission of the ultrasonic beam to the interface with the tank wall.

2. The ultrasonic transducer unit of claim 1, further comprising acoustically transparent media disposed between the acoustic coupler and the tank wall.

3. The ultrasonic transducer unit of claim 2, wherein the acoustically transparent media is silicone grease.

4. The ultrasonic transducer unit of claim 3, wherein the acoustically transparent media is silicone oil.

5. The ultrasonic transducer unit of claim 1, wherein the acoustic coupler comprises polyurethane.

6. The ultrasonic transducer unit of claim 5, wherein the hardness of the polyurethane is in the range of about 20 to about 80 durometer, shore A.

7. The ultrasonic transducer unit of claim 5, wherein the hardness of the polyurethane is about 55 durometer, shore A.

8. The ultrasonic transducer unit of claim 1, further comprising a plurality of mounting magnets connected to the ultrasonic transducer and operable to mount the ultrasonic transducer to the exterior of the tank wall.

9. The ultrasonic transducer unit of claim 8, wherein the mounting magnets are adjustable such that the face of each mounting magnet is substantially parallel to the tank wall when the transducer unit is mounted to the tank.

10. The ultrasonic transducer unit of claim 9, wherein the mounting magnets are each connected to the ultrasonic transducer using a spring.

11. The ultrasonic transducer unit of claim 10, wherein the springs are moveable between a first position in which the springs hold the mounting magnets in a retracted position, and a second position in which the mounting magnets contact the tank wall.

12. The ultrasonic transducer unit of claim 8, wherein the mounting magnets are rotatably threaded into the ultrasonic transducer and at least partially extend from the transducer, wherein rotation of the mounting magnets determines the position of the ultrasonic transducer relative to the tank wall when the ultrasonic transducer is mounted to the tank wall.

13. The ultrasonic transducer unit of claim 1, wherein upon mounting the ultrasonic transducer to the tank wall, the pressure at the interface between the acoustic coupler and the tank wall is about 1.5 pounds per square inch.

14. The ultrasonic transducer unit of claim 1, further comprising a temperature sensor.

15. The ultrasonic transducer unit of claim 1, wherein the acoustic coupler comprises silicone gel.

16. A system operable to measure a liquid level in a tank, the system comprising:
an ultrasonic transducer unit externally mountable to the tank, the ultrasonic transducer comprising:
an emitter to generate an ultrasonic beam to pass through a tank wall and to receive an echo of the ultrasonic beam off a surface of a liquid;
a transducer driver in electrical communication with the emitter;
an acoustic lens coupled to the emitter and including a convex outer surface and configured to shape the ultrasonic beam and configured to diverge the ultrasonic beam and thereby provide an ultrasonic beam with a uniform wavefront after the ultrasonic beam passes through a tank wall;
an acoustic coupler disposed adjacent the acoustic lens and including,
a first concave surface to receive the convex outer surface of the acoustic lens, and
a second concave surface to compliment the curvature of the tank wall,
wherein the acoustic coupler is configured to increase transmission of the ultrasonic beam to the interface with the tank wall;
a communications unit in electrical communication with the ultrasonic transducer unit and operable to cause the transducer unit to generate the ultrasonic beam and to determine a time-of-flight measured between generating the ultrasonic beam and receiving the echo of the ultrasonic beam off the liquid surface;
a first interface operable to transmit the time-of-flight to a satellite data link; and
a second interface operable to transmit the time-of-flight to a portable electronic device.

17. The system of claim 16, wherein the second interface is a wireless interface.

18. The system of claim 16, wherein the second interface comprises a Bluetooth transceiver.

19. The system of claim 16, wherein the second interface is operable to receive a configuration instruction from the portable electronic device.

20. The system of claim 19, wherein the configuration instruction comprises a schedule for determining a time-of-flight and transmitting the time-of-flight using the satellite transmission unit.

21. The system of claim 19, wherein the configuration instruction comprises a dimension of the tank.

22. The system of claim 16, further comprising a satellite transmission unit connected to the first interface.

23. The system of claim 18, further comprising a battery in electrical communication with the emitter, transducer driver, the first interface, and the second interface to provide power thereto.

24. The system of claim 23, wherein the first interface is operable to transmit data corresponding to a power level of the battery.

25. The system of claim 24 further comprising a temperature sensor operable to determine a temperature of the liquid, and wherein the first interface is operable to transmit data corresponding to the temperature of the liquid.

26. A method of generating an ultrasonic beam to measure a liquid level in a tank, comprising:
providing an externally mounted ultrasonic transducer to generate an ultrasonic beam to pass through a tank wall and to receive an echo of the ultrasonic beam off a surface of a liquid;
configuring an acoustic lens with a convex outer surface to shape the ultrasonic beam and compensate for lensing effects of the ultrasonic beam passing through a tank wall;
configuring an acoustic coupler with a first concave surface to receive the convex outer surface of the acoustic lens and a second concave surface to compliment the curvature of the tank wall to increase transmission of the ultrasonic beam through the tank wall;
coupling the acoustic coupler to the acoustic lens;
coupling the acoustic lens to the emitter to receive the ultrasonic beam;
placing the emitter in electrical communication with a transducer driver; and
mounting the emitter, acoustic lens, and acoustic coupler to a tank wall such that the acoustic coupler and the acoustic lens are disposed between the emitter and the tank wall.

27. The method of claim 26, further comprising disposing an acoustically transparent media between the acoustic coupler and the tank wall.

28. The method of claim 27, wherein the acoustically transparent media is silicone grease.

29. The method of claim 27, wherein the acoustically transparent media is silicone oil.

30. The method of claim 26, wherein the acoustic coupler comprises polyurethane.

31. The method of claim 30, wherein the hardness of the polyurethane is about 55 durometer, shore A.

32. The method of claim 30, wherein the hardness of the polyurethane is in the range of about 20 to about 80 durometer, shore A.

33. The method of claim 26, further comprising mounting the ultrasonic transducer to the tank wall using a plurality of mounting magnets connected to the ultrasonic transducer.

34. The method of claim 33, wherein the mounting magnets are adjustable such that the face of each mounting magnet is substantially parallel to the tank wall when the ultrasonic transducer is mounted to the tank.

35. The method of claim 33, further comprising connecting the mounting magnets to the ultrasonic transducer using springs.

36. The method of claim 35, further comprising:
initially providing the springs in a first position in which the springs hold the mounting magnets in a retracted position;
extending the springs to a second position in which the mounting magnets engage the tank wall.

37. The method of claim 33, wherein the mounting magnets are rotatably threaded into the ultrasonic transducer, and at least partially extend from the ultrasonic transducer, wherein rotation of the mounting magnets determines the position of the ultrasonic transducer relative to the tank wall.

38. The method of claim 26, wherein the pressure at the interface between the acoustic coupler and the tank wall is about 1.5 pounds per square inch.

39. A system operable to measure a liquid level in a tank, the system comprising:
an ultrasonic transducer unit externally mountable to the tank, the ultrasonic transducer comprising:
an emitter to generate an ultrasonic beam to pass through a tank wall and to receive an echo of the ultrasonic beam off a liquid surface;
a transducer driver in electrical communication with the emitter; and
an acoustic lens coupled to the emitter and including a convex outer surface and configured to shape the ultrasonic beam and configured to diverge the ultrasonic beam and thereby provide an ultrasonic beam with a uniform wavefront after the ultrasonic beam passes through a tank wall;
an acoustic coupler disposed adjacent the acoustic lens and including,
a first concave surface to receive the convex outer surface of the acoustic lens, and
a second concave surface to compliment the curvature of the tank wall,
wherein the acoustic coupler is configured to increase transmission of the ultrasonic beam to the interface with the tank wall;
a communications unit in electrical communication with the ultrasonic transducer unit and operable to cause the transducer unit to generate the ultrasonic beam and to determine a time-of-flight measured between generating the ultrasonic beam and receiving the echo of the ultrasonic beam off the liquid surface;
a first interface operable to transmit the time-of-flight by a satellite data link; and
a second interface operable to transmit the time-of-flight to a portable electronic device and to receive a configuration instruction from the portable electronic device.

40. The system of claim 39, wherein the second interface comprises a wireless data communications link.

41. The system of claim 39, wherein the second interface comprises a Bluetooth transceiver.

42. The system of claim 39, wherein the second interface is operable to transmit data about the liquid level in the tank.

43. The system of claim 39, wherein the second interface is operable to transmit data about the dimensions of the tank.

44. The system of claim 39, further comprising a battery in electrical communication with the emitter, transducer driver, the first interface, and the second interface to provide power thereto.

45. The system of claim 44, wherein the second interface is operable to transmit data corresponding to a power level of the battery.

46. The system of claim 45, further comprising a temperature sensor.

47. The system of claim 39, wherein the first interface is operable to transmit the time-of-flight by a satellite data link.

48. A system for measuring a liquid level in a tank, comprising:
means for generating an ultrasonic beam;
lens means for controlling the divergence of the ultrasonic beam and including a convex outer surface configured to shape the ultrasonic beam;
coupler means for transmitting the ultrasonic beam through a tank wall disposed adjacent the lens means and including,
a first concave surface to receive the convex outer surface of the acoustic lens, and
a second concave surface to compliment the curvature of the tank wall,
wherein the acoustic coupler is configured to increase transmission of the ultrasonic beam to the interface with the tank wall;
means for receiving an echo of the ultrasonic beam off a liquid surface in the tank;
means for determining a time-of-flight between generating the ultrasonic beam and receiving the echo;
means for transmitting the time-of-flight to a satellite link;
means for transmitting the time-of-flight to a portable electronic device; and
means for calculating the liquid level using the time-of-flight.

49. The system of claim 48, wherein the means for transmitting the time-of-flight comprises a wireless data communications link.

50. The system of claim 48, wherein the means for transmitting the time-of-flight comprises a Bluetooth transceiver.

51. The system of claim 48, further comprising means for transmitting data about the dimensions of the tank to the portable electronic device.

52. The system of claim 48, further comprising means for providing power to the emitter, transducer driver, the first interface, and the second interface.

53. The system of claim 52, further comprising means for transmitting data about the power level of the means for providing power to the portable electronic device.

* * * * *